(12) United States Patent
Blatt

(10) Patent No.: US 6,690,321 B1
(45) Date of Patent: Feb. 10, 2004

(54) MULTI-SENSOR TARGET COUNTING AND LOCALIZATION SYSTEM

(75) Inventor: Stephen Robert Blatt, Bedford, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/200,638

(22) Filed: Jul. 22, 2002

(65) Prior Publication Data (65)

(51) Int. Cl.$^7$ .............................. G01S 3/02; G01S 3/80
(52) U.S. Cl. ...................... 342/126; 342/444; 342/463; 342/465; 367/124
(58) Field of Search ................. 342/126, 451, 342/463, 465, 450, 417, 444; 367/124, 129, 118

(56) References Cited

U.S. PATENT DOCUMENTS

| | | | |
|---|---|---|---|
| 4,806,936 A | * | 2/1989 | Williams et al. ............ 342/126 |
| 5,386,370 A | * | 1/1995 | Woo ............................ 342/126 |
| 5,877,722 A | * | 3/1999 | Shams ........................ 342/444 |
| 6,292,136 B1 | * | 9/2001 | Egnell ......................... 342/432 |
| 6,580,393 B2 | * | 6/2003 | Holt ............................ 342/453 |

FOREIGN PATENT DOCUMENTS

GB         2214025 A    *  8/1989   ........... G01S/11/00

* cited by examiner

Primary Examiner—Ian J. Lobo
(74) Attorney, Agent, or Firm—Daniel J. Long; Robert K. Tendler

(57) ABSTRACT

A system is provided for detecting the presence of two or more acoustic sources or targets such as vehicles that are traveling between an array of unattended passive ground sensors, in which the sensors each include a phased-array microphone and processing to determine the bearing to the acoustic target. The bearings from pairs of these sensors are subtracted one from the other to provide a bearing line difference "delta" which is the indicator of the presence of an acoustic target close to the line between the two sensors of the pair. A tripwire threshold indicating the presence of a target is set when the absolute value of this bearing line difference "delta" is greater than, for instance, 150°, with the "delta" being 180° when the target is on the line between the two sensors. By processing the outputs from multiple pairs of sensors the presence of multiple acoustic targets can be ascertained since the bearing line difference "delta" will result in detected targets only when a target is within a small and controllable lateral distance off of the line between the sensors in the pair.

10 Claims, 5 Drawing Sheets

MULTI-SENSOR TARGET COUNTING AND LOCALIZATION SYSTEM

FIELD OF INVENTION

This invention relates to passive sensing, and more particularly, to a system that can detect the presence of, and bearing to multiple targets that pass between sensor pairs in an array of sensors positioned to intercept emissions from the targets.

BACKGROUND OF THE INVENTION

The last decade of the twentieth century has marked a significant shift in the roles and requirements for today's soldier and small unit team. The "spectrum of conflict" is fast encompassing not only the basic objectives of homeland defense and protection of vital national interests but also peacekeeping and Operations Other Than War.

Lighter, more dispersed, forces are now required to confront situations where the response to any military action may be uncertain, confused, and with potentially rapid transitions to combat. These types of missions place a premium on the ability of small-dispersed forces to rapidly assess their tactical situation without the ability or time to call upon larger surveillance assets.

Key to this ability is faster and more local access to information to support diverse and rapidly changing situations encountered during these missions. Increasingly, forces are called on to participate in activities in areas where little previous information has been gathered on the terrain, where the potential exists for conflict with non-traditional combatants using non-traditional tactics, and in areas not well supported by existing intelligence systems.

Today's soldier can be involved in refugee care at one moment and confronted with full-scale combat in the next. Often these changing situations occur within the same small geographic area such as towns or villages, or street-to-street. These new situations require the ability to access timely local intelligence. The war of the future will be a sensor war; and control of sensor placement and sensor outputs will be key.

Technology is now available to aid in surveillance of the battle space at a cost that makes it affordable for individual soldiers and small units to use. Low cost, easily deployed, micro airborne, ground, and littoral sensor networks are the key to providing the type of information needed by these small soldier teams.

Low cost soldier-controlled sensing devices can extend a small unit's area of influence by providing on-demand local gap-filling situation awareness for missions ranging from reconnaissance to targeting of precision-guided munitions. These sensors give the soldier the immediate ability to see "what's over the next hill" and "what's around the next corner," which the information that can make the difference between failure and success.

These 'sensor networks encompass a variety of sensor types, deployment modes, endurance, and capability. Sensor detection ranges vary from kilometers for air and ground vehicles to meters for personnel and parked ground vehicles. Distributed sensor networks with large numbers of nodes provide more opportunities to follow targets, with greater likelihood that some set of sensors will be optimally placed for classification and verification.

However, distributed sensor networks pose new challenges in the design of algorithms for processing the sensor signals into useful information. Raw data that is initially distributed among many sensor nodes must be combined to generate the desired information. However, the use of interconnecting radio frequency links must be minimized to avoid detection and jamming as well as to conserve power. Power consumption is critical to surveillance lifetime as well as packaging and deployment techniques.

Collaborative processing approaches that build on local collaboration between sensors are attractive because they restrict most communications to nearby sensors, minimizing communication energy requirements.

Collaborative Signal Processing involves low-level sensor processing which occurs local to a sensor node, the exchange of data among sensor nodes to enable decision and other high-level data to be derived from raw sensor signals, a process in which a consensus is reached among sensor nodes about what is occurring in the physical world and reports or digests are created for transmission to users, and the minimization of power consumption one sensor nodes, including communications, signal processing, and sensors.

In the past, arrays of passive listening devices have been used to track tanks and other vehicles. However, at acoustic frequencies the beam widths are too broad to be able to detect individual acoustic targets, which precludes being able to count them. As a result, while vehicle noise can indicate the presence of a vehicle, the number of vehicles is often times difficult to ascertain. Thus the size of an enemy force is difficult to predict.

If techniques are used to distinguish vehicle-generated sounds based on amplitude, these systems are easily spoofed or counter measured. Also, acoustic targets that are close to the sensor inherently have higher amplitude signals than those far way. So amplitude alone is a poor indication of the number of vehicles in a surveilled area.

In order to be able to recognize separate acoustic targets, there have been efforts to triangulate on the targets from an array of sensors which are to establish bearing lines to the acoustic source. However, the beam width of acoustic listening devices is on the order of 12°, which, depending on distance to the acoustic source and the size of the source can result in detecting multiple targets as one target.

Moreover, if triangulation is used to locate the acoustic sources, the area of uncertainty in the position of multiple bearing line overlap is usually quite large. This can mask the presence of multiple acoustic sources.

Secondly, there are so called ghost bearing line crossovers that give false indications of an acoustic source where no acoustic source exists. This means that more acoustic sources will be detected than actually exist.

Thirdly, triangulation type systems are not easily scalable because of the intense computational load when performing many triangulation calculations.

Thus systems that depend on triangulation to ascertain the number and position of multiple acoustic sources are inaccurate and require considerable computer resources. This in turn translates into massive power consumption. Since most of the sensors are battery-powered, triangulation type systems have only limited life due to the limited power available from batteries.

SUMMARY OF THE INVENTION

In order to solve the problems associated with triangulation type systems, a computationally simpler system utilizes a technique in which bearings from pairs of sensors are subtracted one from the other to provide a bearing difference value, or "delta." This value is 180° if the target is on a line between the two sensors, and rapidly drops off as the target moves to either side of this line. A target is said to be detected when this difference value is greater than for instance 150°. This means that the target is relatively close to the line between the sensors.

Bearing is determined locally and does not involve triangulation with its computationally intense algorithms. Also, the two sensors of a pair may be in communication such that a target alarm is only transmitted when the target is sufficiently close to the line between the sensors.

This means that as to the sensor pair, distant targets are ignored all together since the "delta" between bearing lines approaches 0°.

Moreover, targets that are in the vicinity but are too far from the line between the sensors are ignored, again because their "delta" is below a threshold that indicates that the target is somewhere between the sensors close to the line between them.

By processing as targets only those acoustic sources which have a bearing difference value above a preset "delta" threshold, not only do the number of targets indicated reflects the correct number, less communication and computer processing is required.

Of course if the multiple targets all exist in the beam pattern of the sensors in a pair, they cannot be separated. However, ghost results are almost completely eliminated because it is not bearing line crossovers but rather the bearing lines themselves that are the measured quantities.

Additionally, the triangulation method, when used in systems with multiple sensors, of necessity combines information from sensors that are closer to the target as well as farther away. This, combined with the error inherent in bearing measurements, distorts the target position estimate and can lead to splitting of the actual target into two or more tracks.

On the other hand, the bearing line differential method takes two close sensors for each target to provide an unambiguous count and target position estimate. The count for each sensor pair is unambiguous because the target provides one measurement to each sensor, and the bearing line differential method combines the information from two sensors in only one way.

The region, in which a valid target exists, called the region of regard, is determined by the "delta" threshold setting (e.g. 150 degrees). By constructing the regions of regard for each sensor pair to take account of the sensor system geometry, each sensor pair can be made to cover a different area or volume and thus to avoid over counting the number of targets present by having no overlapping regions.

In short, the subject system provides accurate position and an accurate count of acoustic targets for target spacing greater than sensor node spacing. There are low processing requirements for a sensor node which avoids the combinatorial explosion that would occur in triangulation systems when a large number of nodes are used. This is because there are only a small number of potential targets between two sensors of a pair.

Finally, the system is scalable over a number of sensor nodes, with there being only one report per target.

Particularly, the subject system (i) provides accurate count of the number of targets present, (ii) uses data from two closest nodes to provide an accurate position, (iii) requires a minimal number of calculations, (iv) uses an algorithm which is scalable as the number of nodes increases, (v) is such that each calculation requires data from only two nodes so communications does not increase as number of nodes increase, and (vi) can resolve multiple targets if their spacing is greater than the average spacing between nodes, so that improved resolution can be achieved by reducing the node spacing.

The above features are due to the position calculation that uses difference in bearing between nearby sensor nodes, the use of information developed by each sensor pair to determine number of targets present in the sensor field and the construction of a gate region around each node pair to eliminate overlap between node pairs.

In one embodiment, the steps necessary to perform target counting and location calculations are as follows:

a) Collect data from multiple sensors including bearing to each detected target.

b) For each sensor, node calculate the bearing to the neighboring nodes.

c) The gate bearing for each node is the average of the bearing to its two tripwire partners.

d) For each tripwire pair, the width of the gate is the absolute value of the gate bearing minus the bearing to the partner node, and the gate is thus {bearing to tripwire partner+gate, bearing−gate}.

e) As the target data is received, calculate the bearing to the target from each node.

f) If the bearing is within the gate for both nodes of the tripwire pair, calculate the difference in target bearing between the two nodes.

g) Calculate the target position as follows. Use a coordinate system in which the target is moving due north or south and the tripwire nodes are to the left (west) and right (east) of the target.

h) If the absolute value of the bearing difference is 180 degrees, place the target at the mean position between the nodes.

i) If the difference (absolute value) is greater than 103 degrees but less than 180 degrees, place the target x position at the mean x position of the two nodes and offset the y position from the mean y position as follows.

j) Calculate $\Delta x$=the difference in x position between the two nodes.

k) If the bearing difference is greater than 157 degrees and less than 180, y-offset=$0.05*\Delta x$.

l) If the bearing difference is greater than 136 degrees and equal or less than 157, y-offset=$0.15*\Delta x$.

m) If the bearing difference is greater than 118 degrees and equal or less than 136, y-offset $0.25*\Delta x$.

n) If the bearing difference is greater than 103 degrees and equal or less than 118, y-offset=$0.35*\Delta x$.

o) If the bearing difference is less than or equal to 103 degrees, then no position is predicted.

p) The sign of the offset is the same as the sign of the bearing difference.

In summary, a system is provided for detecting the presence of two or more acoustic sources or, targets such as vehicles that are traveling between an array of unattended passive ground sensors, in which the sensors each include a phased-array microphone and processing to determine the bearing to the acoustic target. The bearings from pairs of these sensors are subtracted one from the other to provide a bearing line difference "delta" which is the indicator of the presence of an acoustic target close to the line between the two sensors of the pair. A tripwire threshold indicating the presence of a target is set when the absolute value of this bearing line difference "delta" is greater than, for instance, 150°, with the "delta" being 180° when the target is on the line between the two sensors. By processing the outputs from multiple pairs of sensors the presence of multiple acoustic targets can be ascertained since the bearing line difference "delta" will result in detected targets only when a target is within a small and controllable lateral distance off of the line between the sensors in the pair.

BRIEF DESCRIPTION OF THE DRAWINGS

These and other features of the subject invention would be better understood in connection with the Detailed Description in conjunction with the Drawings of which.

DETAILED DESCRIPTION

It will be appreciated that in any surveillance operation, it is important to be able to process data from a number of sensor nodes to locate the targets and to provide an indication of how many targets are passing through the sensor field as well as the position of each of the targets. It is also important that the system be usable whether or not there are roads or whether or not the terrain channels the movement of a target along any particular line. This is true of course in desert situations, in forest situations and indeed where targets such as tanks or armored personnel carriers can move off-road. While the subject invention will be discussed in terms of acoustic targets such as vehicles which make noise, this invention is not limited to vehicles or even acoustic targets. It can be used anywhere where there are sources emitting any type of detectable signals.

Figure 1:
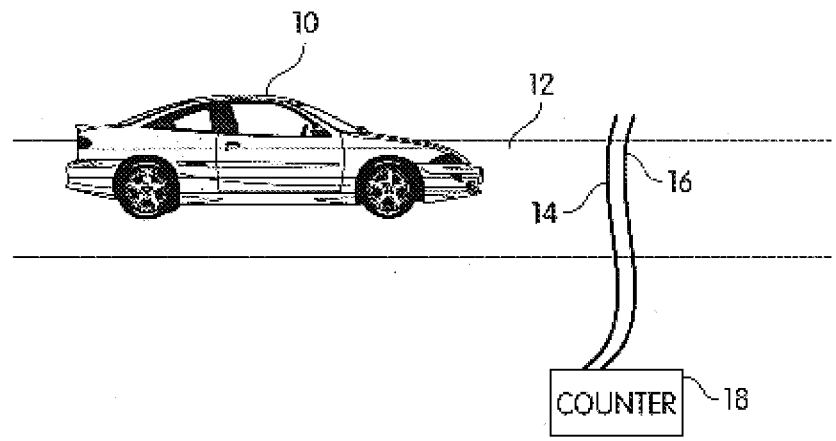
FIG. 1 is a diagrammatic illustration of a typical vehicle counter utilizing conductors lain across a road.

Referring to FIG. 1, it would be a simple matter to count targets if for instance as normal a system of wires or light beams detects the crossing of the wires or the breaking of the beams. However, this is not a covert operation and requires that which is being sensed to go along a given path or road. Thus, for instance, a vehicle 10 traveling on road 12 will cross wires 14 and 16 connected to a counter 18, with sensing of the multiple tire transversals of lines 14 and 16 indicating quite accurately that a vehicle is present and has passed the so-called gate or check point.

Figure 2:
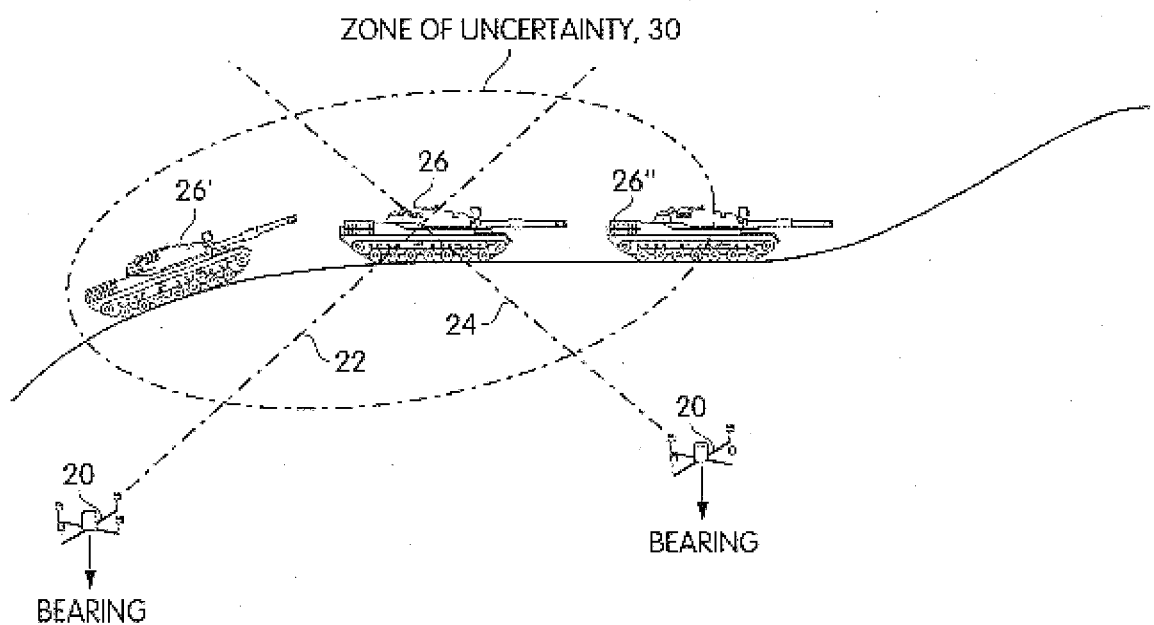
FIG. 2 is a diagrammatic illustration of a prior triangulation type sensing system in which the bearings from multiple sensors are combined to establish the position of a vehicle.

Referring to FIG. 2, for situations such as tactical battlefield situations or situations in which vehicles or other targets are not constrained to a given path or road, a number of passive sensors 20 are deployed in a pattern, with the sensors being such as to provide as an output bearing lines 22 and 24, in one embodiment, to an acoustic source in this case a target 26, with the intersection of the bearing lines indicating the presence of an acoustic target and its position.

However, acoustic phased array microphone sensors typically have beam widths of 12 degrees such that depending on the distance from two sensors, a zone of uncertainty 30 exists.

It will be seen that in this diagram a number of vehicles 26' and 26" are within the zone of uncertainty. The result of detecting sound from these vehicles, at least in the configuration of FIG. 2, is the detecting of only one vehicle when in fact numbers of vehicles are within the beams of the phase array acoustic sensors.

The problem obviously not only is that the targets cannot be accurately located as to position, the numbers of targets is likewise in doubt. Thus, from a surveillance point of view the amount of information from such a triangulating sensor array does not accurately reflect what is happening on the ground and is therefore not particularly useful in providing information as to, for instance, the number of enemy tanks or personnel carriers in the surveilled area.

The system of FIG. 2 is also utilized in some instances to provide an indication of the movement of troops, be they in vehicles or not, with seismic vibrations sometimes being utilized to indicate the presence of a soldier. Whether acoustic sensing or seismic sensing, the result is that there is a problem in detecting the number of targets in a given area.

It will also be appreciated that laser illumination devices do not provide the covert function that is required. Covert surveillance is important so that enemy forces cannot readily ascertain that they are being monitored.

Figure 3:
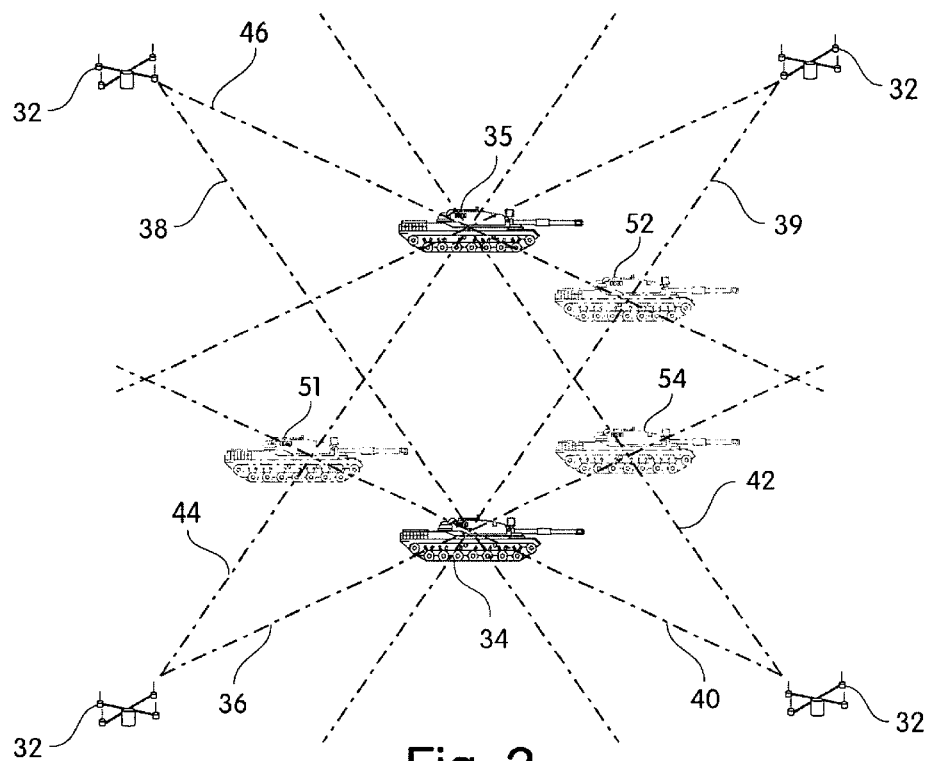
FIG. 3 is a diagrammatic representation of a prior vehicle surveillance system in which not only is the zone of uncertainty large, there are also ghost intersections of the bearing lines from the multiple sensors which gives false indications of the presence of vehicles.

Referring to FIG. 3, not only is the zone of uncertainty problematic due to the relatively wide beam widths of the sensors, as can be seen in FIG. 3, assuming a number of sensors here illustrated at 32, for each of the sensors there is a bearing line to a presumed target. Here actual targets are illustrated at 34 such that intersection of lines 36, 38 and 40 determine a target in the position 34. Likewise, for actual target 35 intersections of bearing lines 42, 44 and 46 locate this particular actual target.

However, there are ghost intersections indicating a ghost target 51 which lies at the intersection of bearing line 44 and bearing line 40, whereas a second ghost target 52 lies at the intersection of bearing line 46 and bearing line 39. Another ghost target at 54 is at the intersection of bearing line 42 and bearing line 36.

What will be appreciated is that using an increased number of sensors can result in more actual targets being detected. However, more ghost targets are equally likely to be detected. Thus with increased numbers of sensors, there are increased numbers of valid intersections and increased numbers of ghost intersections, with the system being unable to distinguish one form the other.

There is also a problem with the computational load that is necessary to compute the intersections of the bearing lines which increases exponentially with the number of sensors in an array.

In summary, with respect to the triangulation systems it will be appreciated that the disadvantages include that each line of bearing intersects multiple lines of bearing from other sensors leading to ghost targets and inaccurate estimates of the number of targets present. Moreover, the number of calculations required increases with the number of bearing lines to be included and hence the number of sensors. Therefore, such systems are not readily scalable as the size of the sensor field increases. Thirdly, with such triangulation systems, there are inaccuracies in bearing accuracy which leads to inaccurate positions and/or splitting of one target into two adjacent targets as the intersection point expands to a polygon. Finally, calculations require data from all nodes that see the target. This results in increased communications as the number of sensor nodes increases.

As will be seen, the subject system provides an accurate account of the number of targets present, uses data from the two closest nodes to provide an accurate position, requires a minimal number of calculations and utilizes an algorithm that is scalable as the number of nodes increase, with each calculation requiring data from only two nodes so communication does not increase as the number of nodes increase. Moreover, multiple targets can be resolved if their spacing is greater than the average spacing between the nodes so that improved resolution can achieved by reducing the nodes spacing.

Figure 4:
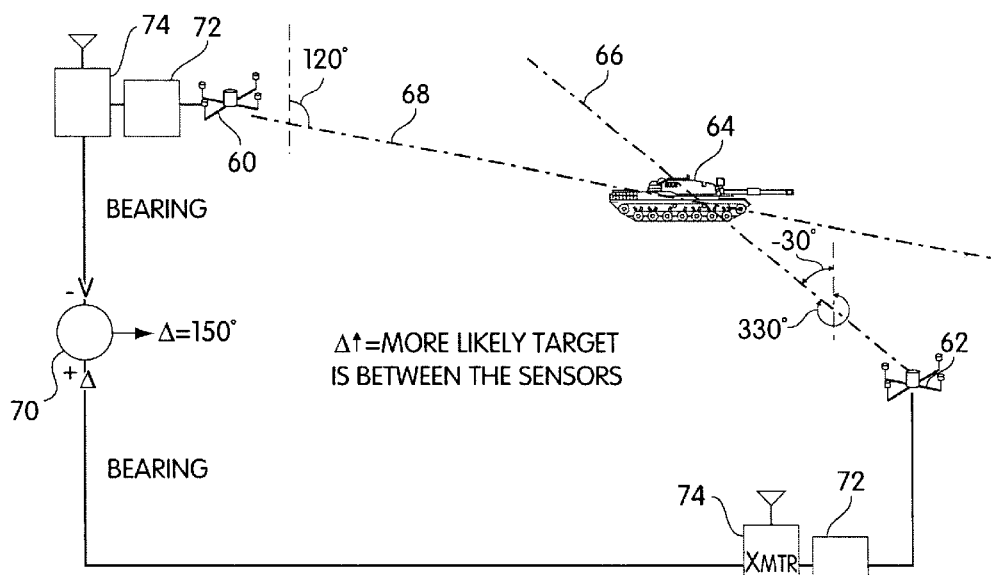
FIG. 4 is a diagrammatic illustration of the utilization of pairs of sensors in which the pairs of sensors provide as outputs the bearing to an acoustic target in which the bearings from the sensor pairs are subtracted one from the other to provide a bearing difference "delta", with the higher the absolute value of the difference up to 180 degrees, the more likely it is that a target is between the two sensors.

In order to accomplish these goals, and referring now to FIG. 4, it will be appreciated that if phased array acoustic sensors 60 and 62 are used to track a target 64, then the bearing from sensor 62 to target 64 is as illustrated by bearing line 66, whereas the bearing from sensor 60 to targets 64 is along bearing line 68. Assuming that the bearing from north is what is calculated, then bearing line 66 is at 330°, whereas bearing line 68 is for instance 120°. This leaves a difference in bearing lines of 210°. This difference is calculated at 70 and is the "delta" which is used as a figure upon which to decide whether a target is detected or not. It will be appreciated that if these sensors are provided with bearing calculation units 72 and that if the output of these bearing calculation units is transmitted by transmitter 74 to a remote location, assuming that the location of the sensors is known, the origin of the bearing lines is established and the intersection of these two lines does in fact specify where the acoustic target is.

Noting that 330° can be described as –30°, subtracting –30° from 120° gives a "delta" of 150°.

Figure 5:
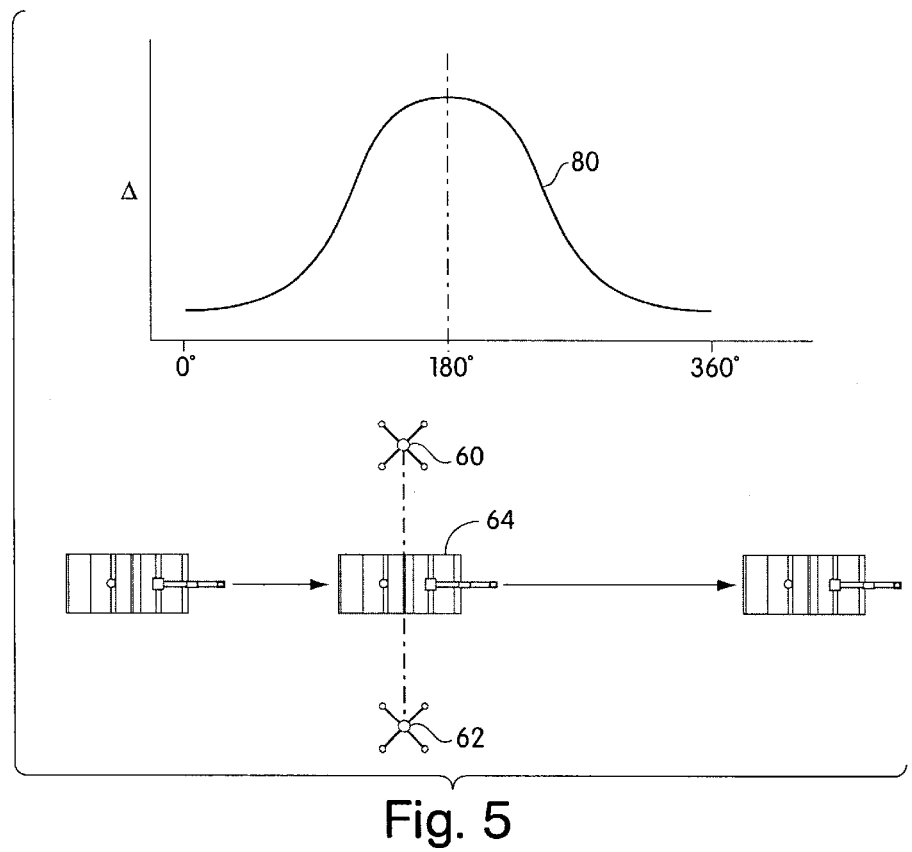
FIG. 5 is a diagrammatic illustration of the bearing difference "delta" for a target going between two sensors such that the "delta" approaches a maximum at 180 degrees when, the vehicle is on a line between the two sensors.

Referring now to FIG. 5, assuming that target 64 is on a line between sensors 60 and 62, then the difference in the bearing lines would be exactly 180°. If one plots the "delta" difference between the bearing lines between sensors 60 and 62, one achieves a curve such as illustrated at 80 that has a maximum at 180° and trails off to zero when the target is to either side of the line between 60 and 62 by a large distance.

If the target is not between sensors 60 and 62 but is at some distance therefrom, then the system will not operate to detect targets. The reason for this is that the difference in bearing line angles will be close to zero for targets far removed from these two sensors and therefore is not detected.

Figure 6:
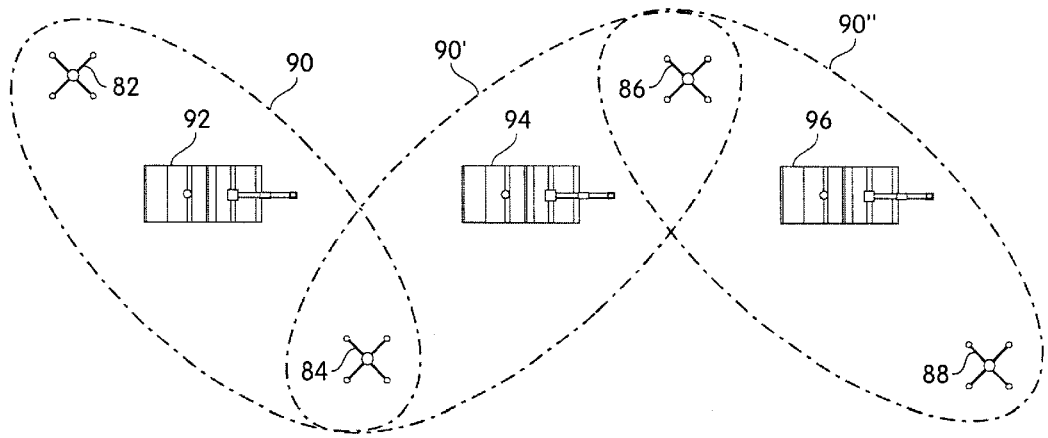
FIG. 6 is a diagrammatic illustration of a number of pairs of sensors in which by setting thresholds such that the "delta" must be greater than 150 degrees, targets can be isolated as being between a given pair of sensors.

Referring to FIG. 6, for a sensor field involving sensors 82, 84, 86 and 88, assuming that the targets to be valid must be within a certain distance from the line between the pairs of sensors, and assuming that this is a very narrow region such as illustrated at 90, then a target 92 is uniquely between sensors 82 and 84 if within region 90, whereas target 94 will be between sensors 84 and 86 uniquely if within region 90', whereas target 96 will be between sensors 86 and 88, again if within the narrow region 90'.

Figure 7:
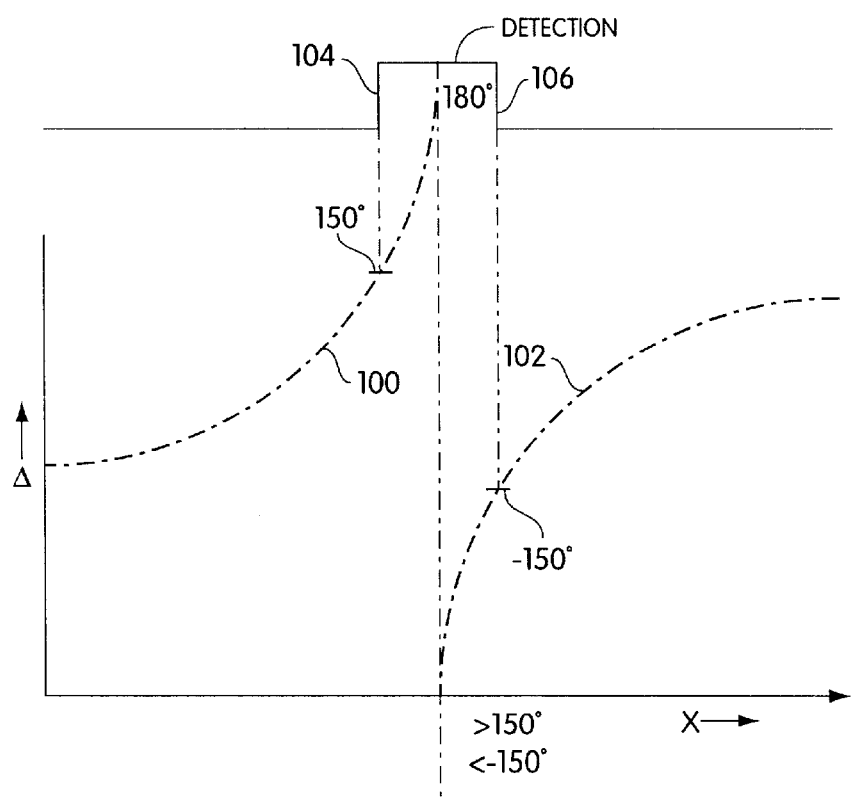
FIG. 7 is a graph of the bearing difference "delta" showing that as a target passes between a pair of sensors the difference in bearing angles ranges from zero up to 180 degrees when the target is on a line between the two sensors, with the target detection being indicated when the absolute value of the bearing difference is greater than, for instance, 150 degrees.

The narrow region 90 is defined by the bearing line difference "delta" above which a target is said to exist. For instance, in the above noted examples and referring now to FIG. 7, "delta" is plotted against position such that as the target moves between the two sensors the "delta" goes from zero through 150° to 180° and from –180° back through –150° to zero. As can be seen by the "delta" bearing line differences 100 and 102, when these lines pass through these 150° and –150° thresholds, a detection circuit detects the presence of a target such that the leading edge of the detection pulse at 104 corresponds to the "delta" being 150° or larger, whereas pulse edge 106 cuts off when the "delta" decreases below –150° and goes back to zero.

Figure 8:
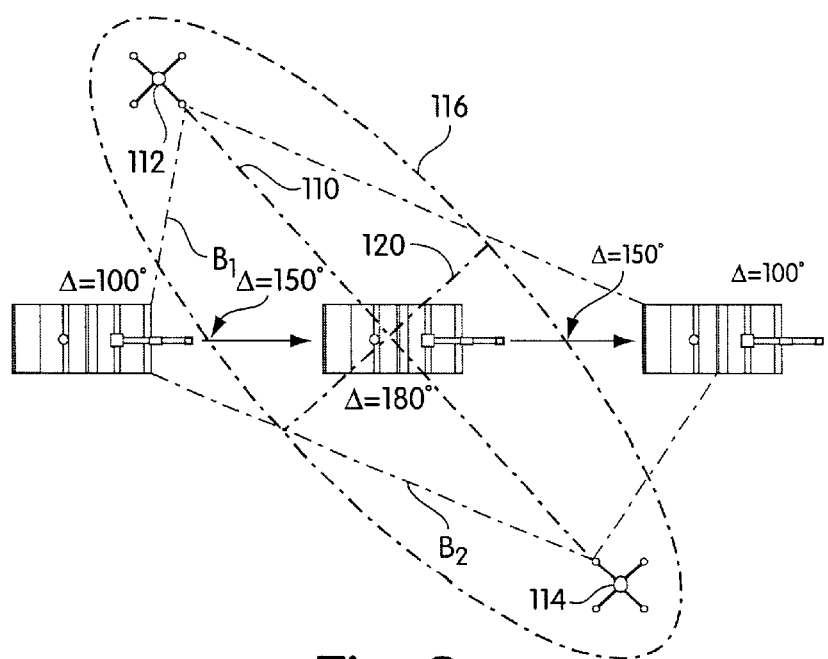
FIG. 8 is a diagrammatic illustration of a target moving between two sensors, indicating an elliptical region bounded by the 150 degree bearing difference line, with the width of this region determining how far off a line between the two sensors a target can be to be detected; and, FIG. 9 is a diagrammatic illustration of a sensor having an array of microphones with one meter spacing, along with processing circuitry which, when coupled to the outputs of the microphones, determines the direction of an acoustic source or target, and transmits the bearing to the acoustic source to processing circuitry either at a central location or at the other of the pair of sensors making up the sensor pair.

As illustrated in FIG. 8, assuming that there is a bearing line 110 between sensors 112 and 114, one can draw a region 116 that corresponds to the region of target detectability between the two sensors. This region is as narrow as desired, with the region being defined in width by line normal to line 100, namely line 120, such that the length of line 120 along with the position of sensors 112 and 114 defines the detection region between the two sensors of the pair.

In short, the subject system operates such that the bearing tripwire algorithm consists of two parts. The first is the bearing difference calculation between two nodes and the second is the gating mechanism between adjacent trip wire pairs. The latter is necessary to avoid identifying the same target in adjacent tripwire pairs thus double counting the targets. The tripwire algorithm calculates the difference between the bearing measured from two nodes or sensors. The target position is then estimated based on the mean of the position of the two nodes and the bearing difference. If the absolute bearing difference is near 180°, the target is placed at the mean position between the nodes. As the bearing difference decreases, the target position is offset from the mean position appropriately.

An area of interest or gate is thus established around each tripwire pair in order to avoid identifying the same target in adjacent tripwire pairs. In one embodiment, the target positions are calculated only when the bearing from each node falls within the gated area, i.e., the intersection is within a predetermined narrow oval.

In one embodiment, the following algorithm is used to determine the size of the bearing gate. For each node, the heading of its two partners is determined. The gate is established as the average of the two headings. The tripwire calculations are performed only when the target bearing is within the interval, namely the heading to tripwire partner plus gate, heading minus gate.

The benefits of the bearing tripwire algorithm are that it provides accurate position within a sensor grid, provides accurate counts when the target spacing is greater than the node spacing and requires only minimal processing capability. This algorithm avoids the calculational combinatorial explosion inherent in a line of bearing intersection calculation due to the small potential number of targets between two sensors in a pair. The algorithm is scalable over the number of nodes since it provides only one port per target.

Figure 9:
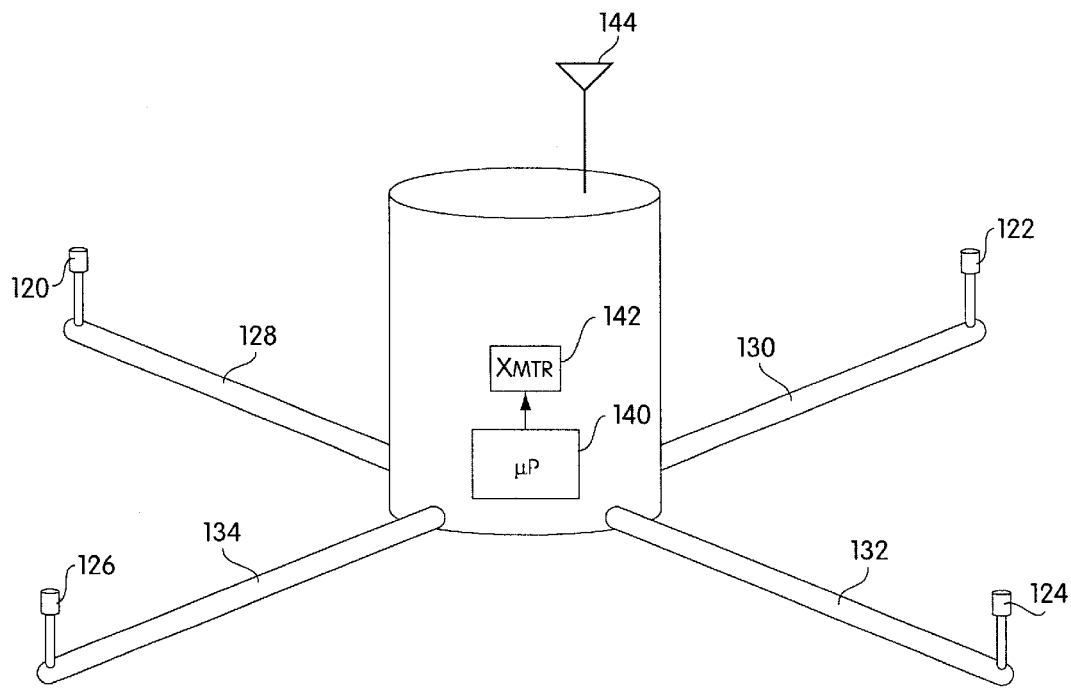

Referring now to FIG. 9, a phased array acoustic sensor in one embodiment is available as Model 3304-0 manufactured by Gentex Corporation of Derry, N.H. Here a sensor is comprised of four microphones 120, 122, 124 and 126 on respective arms 128, 130, 132 and 134. Each of these arms extends laterally such that the spacing from one microphone to the diametrically opposite microphone is one meter.

These microphones pick up acoustic signals which are processed by a bearing line processor 140, with the output, namely the bearing line, being transmitted via transmitter 142 and antenna 144 to, for instance, the other of the pair of the sensors. Apparatus within this other sensor having calculated the bearing from it to the target and also has the bearing from the first sensor to the target. This apparatus then determines if the difference in bearings is within the "delta" threshold. If so, a report of the existence of a target and its location is transmitted back to a central processing location.

It will be appreciated that the amount of communication required is minimized due to the fact that there is no communication back to the central processing location unless it has been determined that there is a valid target between the two sensors of the pair. This completely eliminates all of the communication associated with multiple sensors in the triangulation systems described above, which would completely overload the system and result in massive battery drain.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for detecting the presence of multiple sources of radiation, comprising the steps of:
   dispersing a number of sensors in an area, each sensor capable of determining the bearing to a source of radiation;
   processing the outputs from pairs of sensors to generate a signal reflecting the subtraction of a bearing line to a source from one of the pair from the bearing line to the source from the other of the pair, thus to determine a delta; and,
   indicating the presence of a source when the delta is above a predetermined number.

2. The method of claim 1, wherein the predetermined number is the number of degrees.

3. The method of claim 1, wherein the sources include acoustic sources.

4. The method of claim 1, and further including the step of triangulation processing for ascertaining the position of the sources based on the bearing lines.

5. The method of claim 1, wherein the delta above a predetermined number indicates that a source is removed from a line between the pair of sensors by no more than a predetermined distance.

6. The method of claim 1, wherein the sensors are arranged in pairs of sensors and wherein a source within a predetermined distance of a line between a predetermined pair excludes the last mentioned source being within a predetermined distance of a line between a different pair of sensors, thereby to distinguish multiple sources.

7. The method of claim 6, wherein the predetermined distance is set by the delta.

8. The method of claim 6, wherein multiple sources are separately detected when the spacing between sources exceeds the spacing between sensors.

9. The method of claim 1, wherein pairs of sensors communicate with each other to permit determining when a source is within a predetermined distance from a line between the sensors of the pair, and further including the step of processing the outputs of the sensors for determining the position of a source only when the delta is above a predetermined number, whereby position calculations are conducted only when a source is within a predetermined distance of the line between the sensors in the pair, such that position calculations are minimized.

10. A method for minimizing processing to determine the location of a source of radiation through the use of triangulation and a pair of sensors, comprising the step of: processing triangulation information from a pair of sensors only when a source of radiation is within a predetermined distance from a line between the pair of sensors, the sensors providing as an output the bearing line between the sensors and the radiation source, the predetermined distance being a result of the subtraction of the bearing line from one sensor of the pair to the radiation source from the bearing line from the other sensor of the pair to the radiation source exceeding a predetermined delta.

* * * * *

UNITED STATES PATENT AND TRADEMARK OFFICE
CERTIFICATE OF CORRECTION

| | | |
|---|---|---|
| PATENT NO. | : 6,690,321 B1 | Page 1 of 1 |
| APPLICATION NO. | : 10/200638 | |
| DATED | : February 10, 2004 | |
| INVENTOR(S) | : Stephen Robert Blatt | |

It is certified that error appears in the above-identified patent and that said Letters Patent is hereby corrected as shown below:

The Patent should include the following:

Col. 1 line 4
Statement of Government Interest

The invention was made with United States Government support under Contract No. N66001-00-C-8054 awarded by the Navy. The United States Government has certain rights in this invention.

Signed and Sealed this

Twentieth Day of February, 2007

JON W. DUDAS
*Director of the United States Patent and Trademark Office*